United States Patent [19]

Canziani

[11] Patent Number: 4,732,260

[45] Date of Patent: Mar. 22, 1988

[54] APPARATUS FOR THE SELECTION AND SORTING OF OBJECTS

[76] Inventor: Francesco Canziani, Via Contardo Ferrini 21, S. Macario (Varese), Italy

[21] Appl. No.: 107,769

[22] Filed: Dec. 28, 1979

[30] Foreign Application Priority Data

Aug. 30, 1979 [IT] Italy ............................... 25367 A/79

[51] Int. Cl.⁴ .............................................. B65G 47/46
[52] U.S. Cl. ................................... 198/365; 198/359; 198/372; 209/653; 209/655; 209/657
[58] Field of Search ............... 198/359, 360, 365, 372; 209/653, 655, 656, 657

[56] References Cited

U.S. PATENT DOCUMENTS

| 968,053 | 8/1910 | Heldmann | 209/655 X |
| 3,246,733 | 4/1966 | Torbet et al. | 198/372 |
| 3,661,255 | 5/1972 | Toth | 209/655 |

FOREIGN PATENT DOCUMENTS

| 2745298 | 11/1978 | Fed. Rep. of Germany | 198/365 |
| 2741788 | 1/1979 | Fed. Rep. of Germany | 198/372 |
| 2302150 | 9/1976 | France | 209/657 |

Primary Examiner—Joseph F. Peters, Jr.
Assistant Examiner—Paul E. Salmon
Attorney, Agent, or Firm—McGlew and Tuttle

[57] ABSTRACT

An apparatus is disclosed for selectively sorting objects which comprises a fixed conveyor table having guide rails thereon and an endless conveyor member movable over the table. The conveyor member is formed of a plurality of connected plates which each have a slot therein and which each include a slidably mounted pushing element. The pushing element includes a throttle planet wheel comprising at least two spaced rollers engageable with the rail to move the slider transversely across the respective plate. Objects are thus discharged from the conveyor at selected stations spaced along the conveyor travel path. Each station is provided with a multi-positioned hopper which can supply the discharge object into one of a plurality of containers.

11 Claims, 17 Drawing Figures

Fig. 17

APPARATUS FOR THE SELECTION AND SORTING OF OBJECTS

FIELD AND BACKGROUND OF THE INVENTION

The present invention relates to a device for the selection and the sorting of objects, particularly suitable for use in post offices, warehouses and all other places where it is necessary to sort, select and pack objects, especially those of a small size.

A device according to the invention consists essentially of a conveying element, which may be formed of a series of flat elements slidable on guides along a closed circuit, along which circuit are located a series of pushing elements, which are operated and programmed from a distance. The pushing element push the objects to be sorted, which objects are located on the conveyor, along suitable ducts and toward final racks which are placed along the path, on both sides of the conveying elements.

These ducts may be subdivided into more bins or may be moved toward other final racks in order to permit, for the same length of travel of the conveying element, the sorting toward a higher number of collecting racks. This apparatus may be programmed electronically, for example by means of a computer which commands the action of the pushing elements near the discharge stations, thus permitting a full utilization of the sorting characteristics which are typical of the present apparatus.

With a difference from the machines which operate on a turnover or tilting basis, the push-type discharge, which will be described hereinafter, is completely precise so as to permit the use of discharge stations of lesser dimensions, and thus of more stations.

The absence of empty spaces between the plates which form the conveying element makes it easy to load the same at 90°.

Sorting devices are already known and are used, for example, in post offices, in stores which sell spare parts, in large mail selling organizations, and in material treating laboratories, etc.

In these devices, in correspondence of each collecting area, there are provided control means for the pushing element, so as to bring it from one side to the other of the conveying element in order to effect the unloading of the material on both sides of the conveyor.

Said pushing means, which are present, are activated mechanically so as to transverse the conveyor in a direction perpendicular to the forward movement of the conveyor.

Along the sides of the path of travel of the conveying element, are located the collecting stations, which are disposed along the path and on both sides thereof. The articles to be sorted are collected at these stations in containers which may consist of carts, collecting sacks or the like.

In all such known conveying elements there is often encountered, particularly if the objects being transported are small and if the discharge stations are numerous, considerable difficulties, especially of dimensions, for the topographic location of the discharge stations, taking also into account the elevated speeds of advancement.

SUMMARY OF THE INVENTION

To eliminate the aforementioned inconveniences, the present invention proposes a selecting and sorting apparatus for objects, especially those of a small size, consisting essentially of a conveying element along the moving path of which are located multiple discharge stations each capable of directing the objects being sorted toward a plurality of final separate containers, through different paths which can be selected by the action of suitable movable panels, or by the rotation of the collecting device to bring same in correspondence with the inlet openings of the various final containers.

An essential characteristic of the invention is that of providing, on sorting devices of the traditional type, the combination of elements capable of effecting an additional sorting operation of the objects arriving from a single discharge station of the conveying device.

In particular the means for effecting the additional sorting operation consist of hoppers equipped with deflecting gates, activated by means which may be commanded at a distance, preselectable, these means being in particular in the number of $n-1$ if $n$ is the number of the final collectors.

In particular, according to the invention, there are provided means to connect collecting containers which are fixed with respect to each hopper.

According to a possible variation of the invention there is provided a single collecting hopper movable by known means in correspondence with more than one container.

According to a particular aspect of the invention, the hoppers are equipped with closure means, actuable manually and automatically, to prevent the discharge when the collecting containers are not present.

Another object of the present invention is to provide improved means for the actuation of the pushers of the conveyor-sorter, so as to avoid sudden accelerations, with resulting noise levels or breakdowns. Accordingly, the pushing elements, which slide along slits in the conveyor extending in a direction perpendicular to the direction of advance, interact with a command rail or cam by means of a thrust planet wheel fixed onto each pushing element, and being capable of a partial rotational movement about the axis of a pin or rod which connects them to the pushing element, so as to avoid sudden accelerations which could result in damage to the objects.

The guides consist of a fixed and a movable part, which may be inserted, on command, along the path of the thrust planet wheel.

This wheel, thanks to it particular characteristics, permits the use of extremely simple guides, having a substantial degree of inclination with respect to the direction of motion of the conveyor, thus permitting a more rapid activation of the pushing device and the installation of a higher number of collecting stations.

BRIEF DESCRIPTION OF THE DRAWINGS

The present invention will now be described in detail, by way of illustration and not of limitation, with particular reference to the attached drawings in which.

DESCRIPTION OF THE PREFERRED EMBODIMENTS

Figure 13:
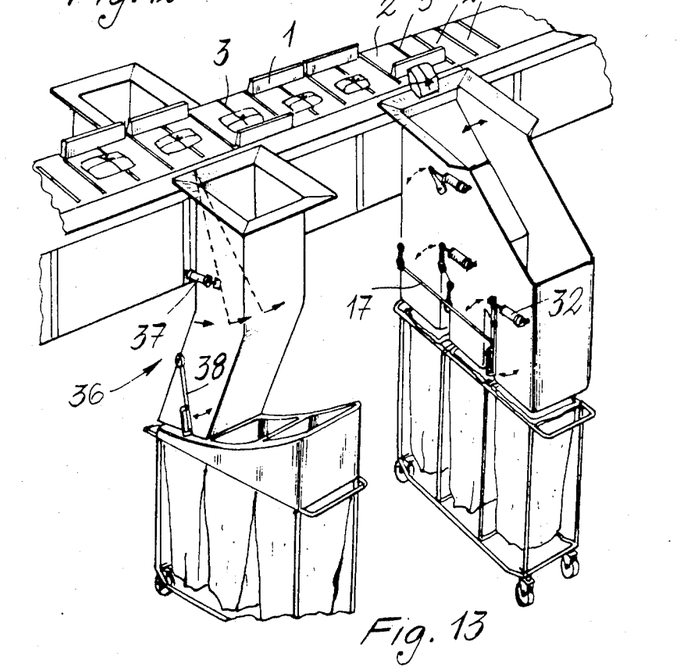
FIG. 13 is a perspective view of a portion of the conveyor and of two versions of the discharge station represented by a movable hopper, to the left, and by a hopper fixed, to the right.

Referring to the drawings, in FIG. 13, a device for selectively sorting objects is shown which comprises a fixed conveyor table 100 having a conveyor thereon.

A series of or plates 2 (FIG. 13) run along the closed or endless circuit and are driven by devices of the known type. Each of these planes is crossed by a slit 3 which is, perpendicular to the direction of advancement. A pushing element 1 is slidable over and in contact with each plane 2, over its respective slit 3.

Figure 5:
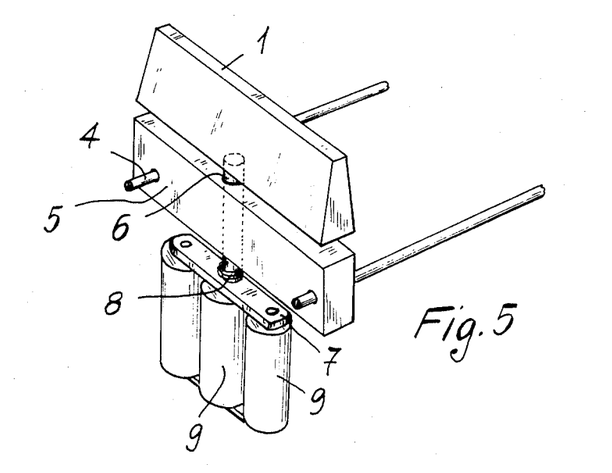
FIG. 5 is a perspective view of a drive element for the pushing element and of the related thrust planet wheel.
Figure 6:
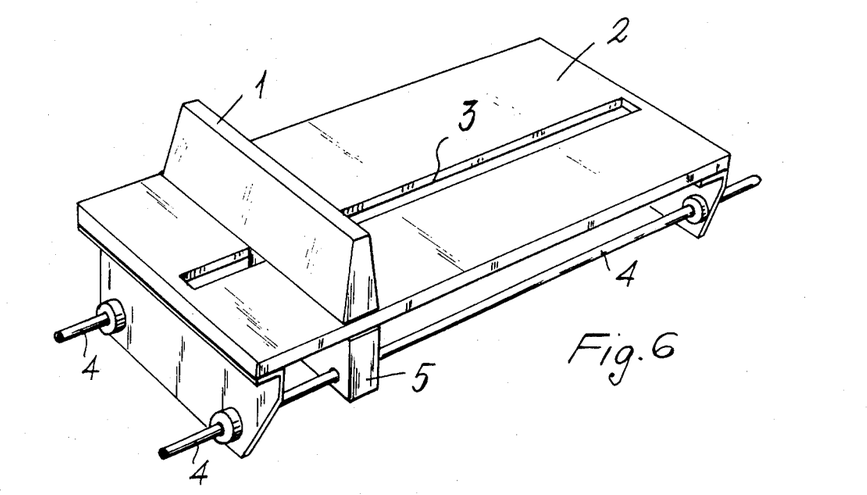
FIG. 6 represents a perspective view of an arrangement for the conveying element.
Figure 7:
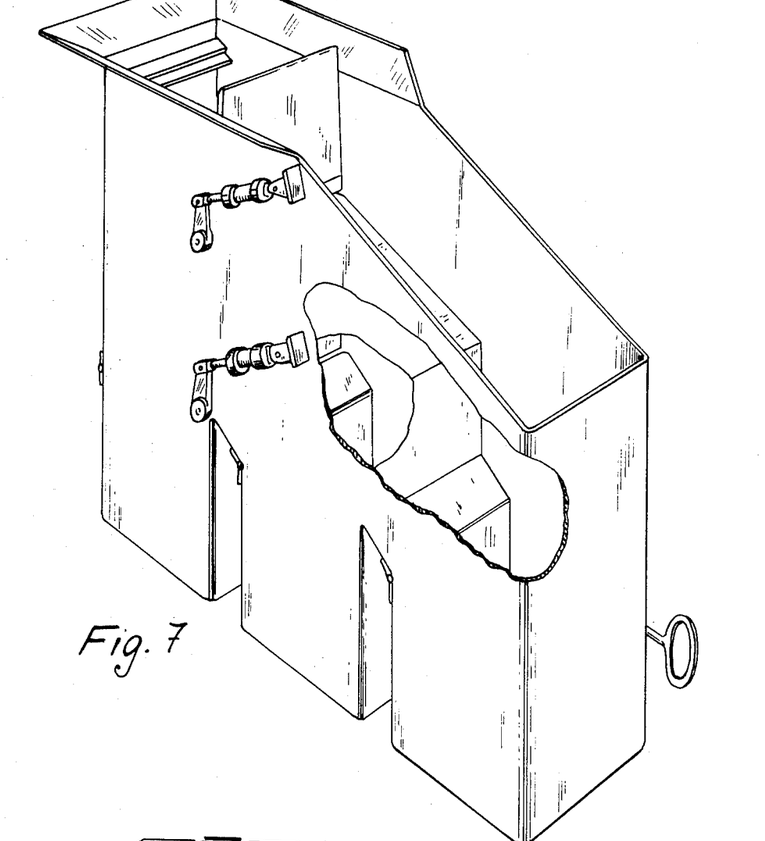
FIG. 7 represents a perspective view, partially in section, of a discharge hopper.

Below each single plane (FIGS. 5 and 6) a drive element 5 is constrained to slide along two guides 4 fixed onto the plane 2 and extending in a direction parallel to the slit 3. Onto this drive element is fixed the pushing element 1. The drive element 4 is fixed to a pin 6, located below it, about which may rotate a thrust or throttle planet wheel 7, maintained in a position parallel to the direction of advancement by a spring 8. At the ends of said planet wheel and at the center thereof, in correspondence with the pin 6, are found rollers 9. Below the series of planes 2, along the conveying path (FIGS. 2, 3 and 4), and on Table 100, are located a series of cams or guide rails 10 one end of which 11 is movable and, commanded by known means, preferably electropneumatic pistons, may slide from a position in which it intercepts the path of the throttle element 7 when the pushing element 1 finds itself in the vicinity of a lateral edge of the plane 2, to a more interior position in which the two elements do not interact.

Figure 1:
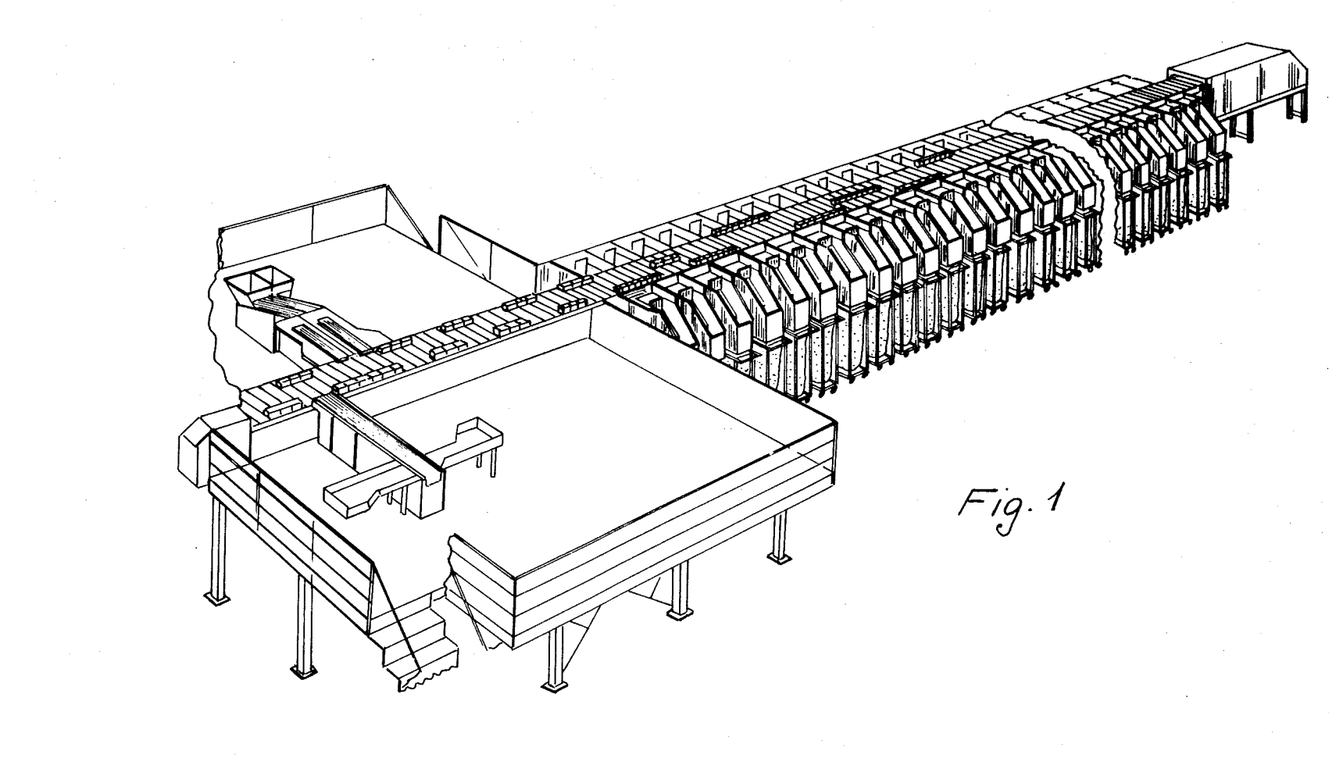
FIG. 1 represents a perspective view of a conveying device according to the invention.
Figure 2:
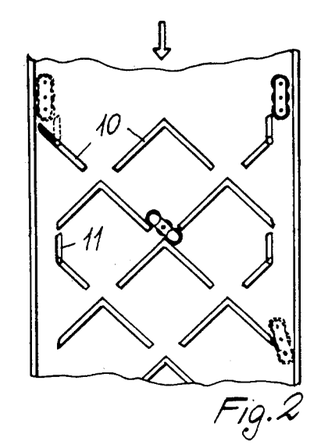
FIG. 2 represents a view from above of a series of rail guides having a movable part capable of effecting a rotational movement.
Figure 3:
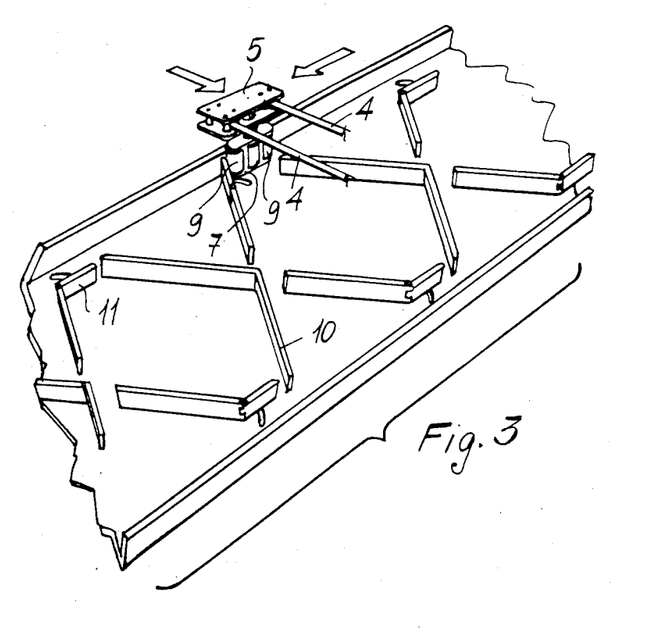
FIG. 3 is a perspective view of a part of the guide rails, of a throttle planet wheel and of a driving element for the pushing element.
Figure 4:
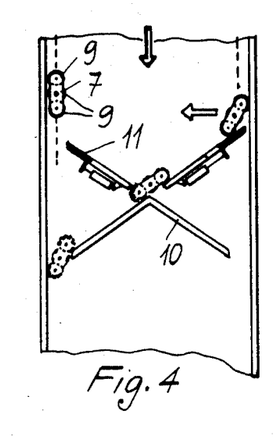
FIG. 4 represents a view from above of a portion of a guide rail with a slidably movable part.

The guide rails which, with respect to the direction of advancement, may extend from right to left or vice versa, intersecting each other at the intersection points, are interrupted by a tract having dimensions larger than the width of the planet wheel 7, but less than the distance between two consecutive rollers of said planet wheel. The wheel 7 is formed of a frame and at least two spaced rollers.

Along the two sides of the circuit are located a series of collecting hoppers.

Figures 9, 10:
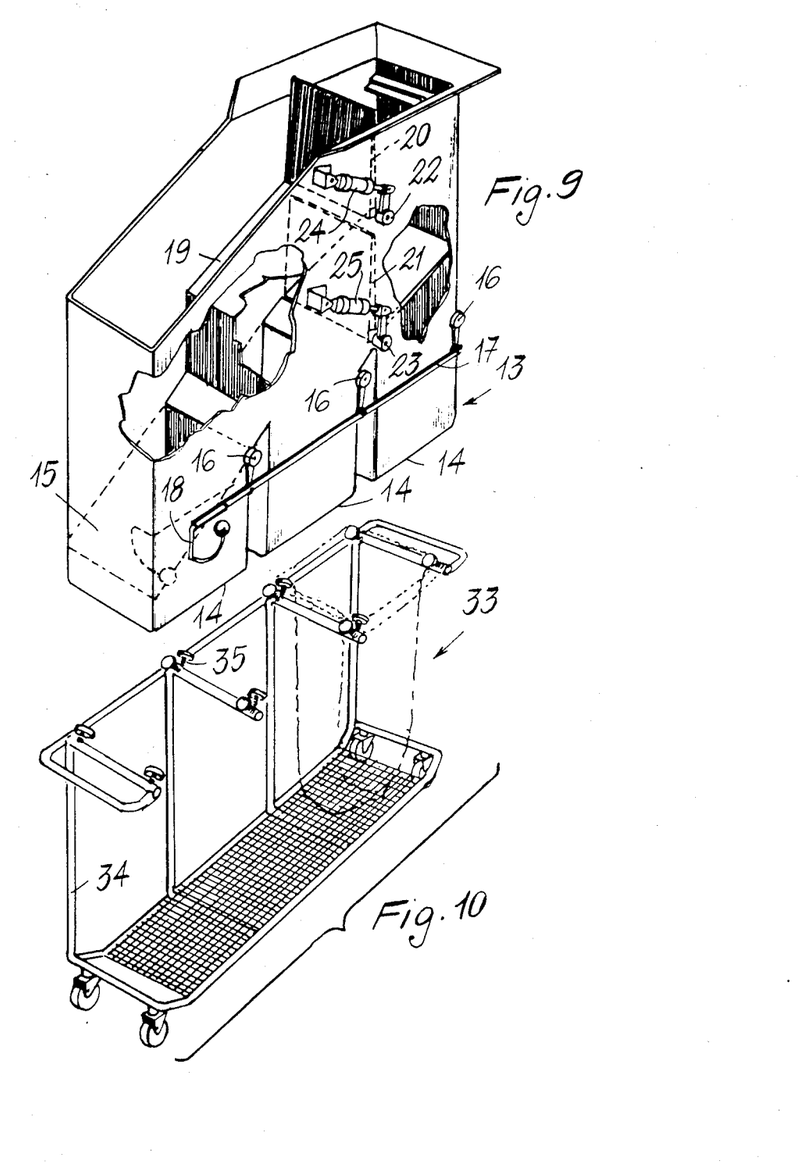
FIG. 9 represents a perspective view, partially in section, of an additional version of the discharge hopper.
FIG. 10 represents a perspective view of a support cart for the final containers.

One of them is illustrated in FIG. 9 and generally indicated, in its entirety at 13.

This hopper, open at the upper part thereof, has the bottom portion divided into a plurality of compartments 14 (three compartments in the specific illustrated case). A series of internal panels, hinged at 16, are activated by an external layer 17 with the handle 18 shaped to close at the lower part thereof the compartments 14.

At the inside there is present a central fixed inclined wall 19. Two movable walls 20 and 21 are hinged respectively at 22 and 23 and are commanded by electropneumatic pistons 24 and 25. The length of the lever 17 is such that, in the open position, the handle of the lever with respect to the outer wall of the hopper finds itself at a distance only slightly higher than the thickness of the frame of the cart which carries the final containers, so that it is possible to block the cart itself merely by rotating the handle.

Figure 8:
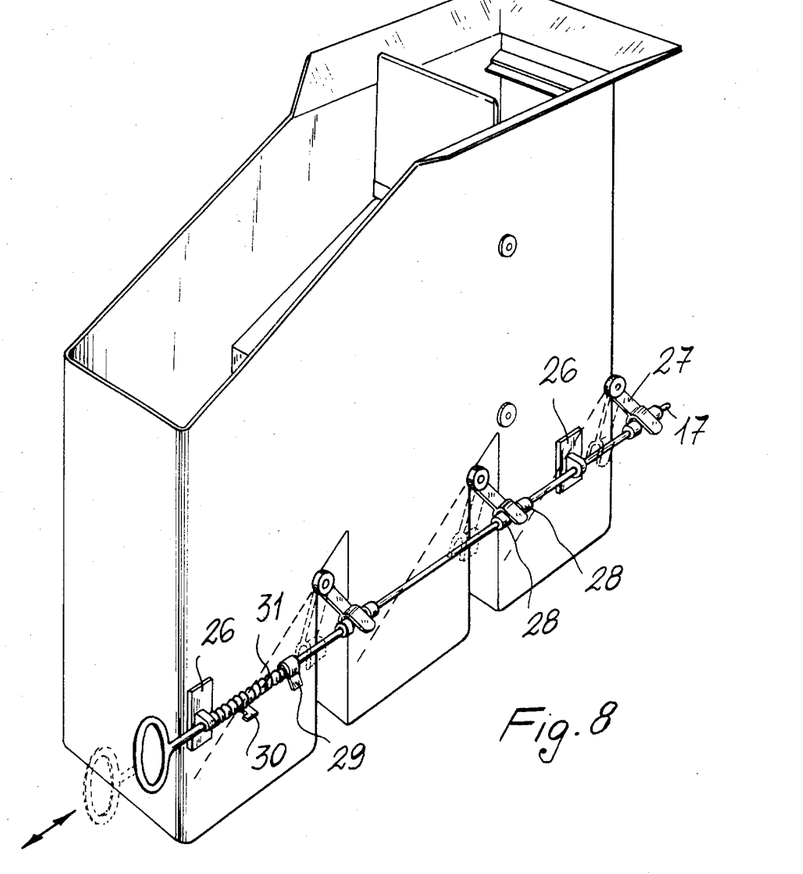
FIG. 8 represents a perspective view of an additional version of the discharge hopper.

A second version of the hopper is illustrated in FIG. 8 and has a lever 17 which slides between two fixed supports 26.

The panels for closing the bottom are controlled by means of fork-shaped levers 27 which are in turn controlled by the lever 17 by means of the fixed washers 28. A tongue 29, fixed onto lever 17, can be restrained by the stop 30 to block the lever in the closed position acting against a spring 31. That is, tongue 29 can be hooked onto the left side of stop 30. According to a further version (FIG. 13) the lever 17 may be actived by means of an electropneumatic piston 32. A cart, indicated in its entirety at 33 in FIG. 10, consists of a frame 34 to which are fixed, on the upper part thereof, by means of springs, the knobs 35 to which are fixed the containers, such as bags or sacks, which are then brought with the respective inlet openings in correspondence with the lower outlets of the hopper 13.

The operation takes place in the following manner: at the moment of loading, the operator, according to the side where the discharge will be effected, presets the pushing elements, which are initially located at the center of the carrying planes, to the side opposite to the discharge side.

In this manner it is possible to activate at the same time the movable parts of the rails from both sides, while the pushing element has been previously positioned so as to intercept that part which will push it to effect the discharge operation from the selected side.

In correspondence with the discharge station the movable part 11 of the guide rail is activated in a known manner so as to intersect the path of the planet wheel 7 (FIGS. 2-4). When the throttle planet wheel comes into contact with the rail, a roller of said planet wheel will begin to follow the path of the rail while the opposite roller will remain always in contact with the side wall of the conveying apparatus. In this manner the throttle planet wheel is made to rotate, moving at the same time in a direction perpendicular to the direction of advancement carrying with it, by means of the pin 6, the pushing element which can thus begin its movement without any sudden accelerations since, at the beginning of the movement, the perpendicular displacement of the central roller and of the drive pin of the pushing device will be equal to one half of the displacement of the roller which is in contact with the guide rail, permitting thus the use of guide rails at a substantial inclination, notwithstanding the high velocities of advancement of the conveying apparatus, and thus not acting on the pushing element and consequently on the objects to be sorted by reason of accelerations which are too sudden. Once the pushing element has traveled along all of the slit 3, the guide rail ends and the throttle 7 is brought back into position by the action of the spring 8. Since the axes of the rollers of the throttle planet wheel have a distance between each other greater than the length of the interruption in the guide rails, the planet wheel will always be in contact with the rail on at least two points and thus in this manner all possibilities of jamming or deviations in motion will be avoided.

Figure 12:
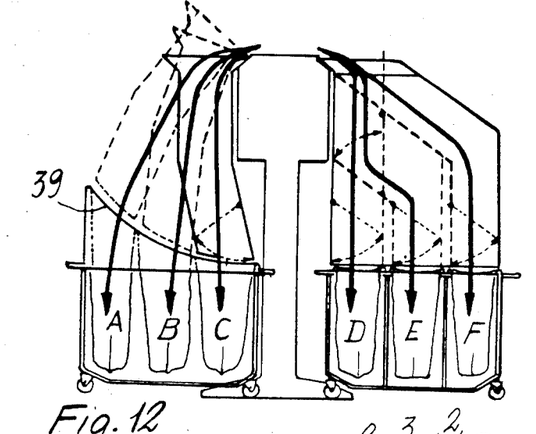
FIG. 12 represents the ducting paths on the inside of the discharge stations for a movable discharge station to the left, and for a fixed discharge station movable having inside panels or gates, to the right.

The objects to be sorted, once they fall in the hopper, are routed toward the respective collection sacks fixed onto the carts which are then placed under the hopper, by activating the panels 20 and 21 (FIG. 9). In FIG. 12, on the right, are indicated the various paths on the inside of the hoppers according to the positioning of said panels.

When the panel 20 is closed (in its inclined position), the object slides on said panel, passes on the fixed panel 19 and arrives at the outermost discharge outlet (path F).

If, on the other hand, the panel 20 is open (vertical position), the object falls into the first discharge outlet if the panel 21 is also raised or open (path D), otherwise the object is diverted by the latter toward the central discharge outlet (path E).

When the collecting cart is removed, it is not necessary to interrupt the operation of the unit since it is only necessary to activate the lever 17 to close the lower section of the hoppers and at the same time to collect therein the objects being sorted. In this manner it is possible to utilize a higher number of final collectors for the same length of the circuit, with the same number of discharge stations.

A different embodiment of the apparatus is illustrated, on the left side, in FIG. 13 and in FIG. 12.

In this embodiment, the hopper, indicated in its entirety at 36, is a single body and is made to rotate about its upper edge by an electropneumatic piston 37. A lever 38 activates a panel for the closure of the bottom. In this case the upper portion 39 (FIG. 12) of the cart 33 will be shaped in an arc form so as to follow exactly the path of the hopper 36.

Still in FIG. 12, at the left there are indicated the various paths of the objects to be sorted, indicated with A, B and C, depending on the positions of the hopper.

Figure 14:
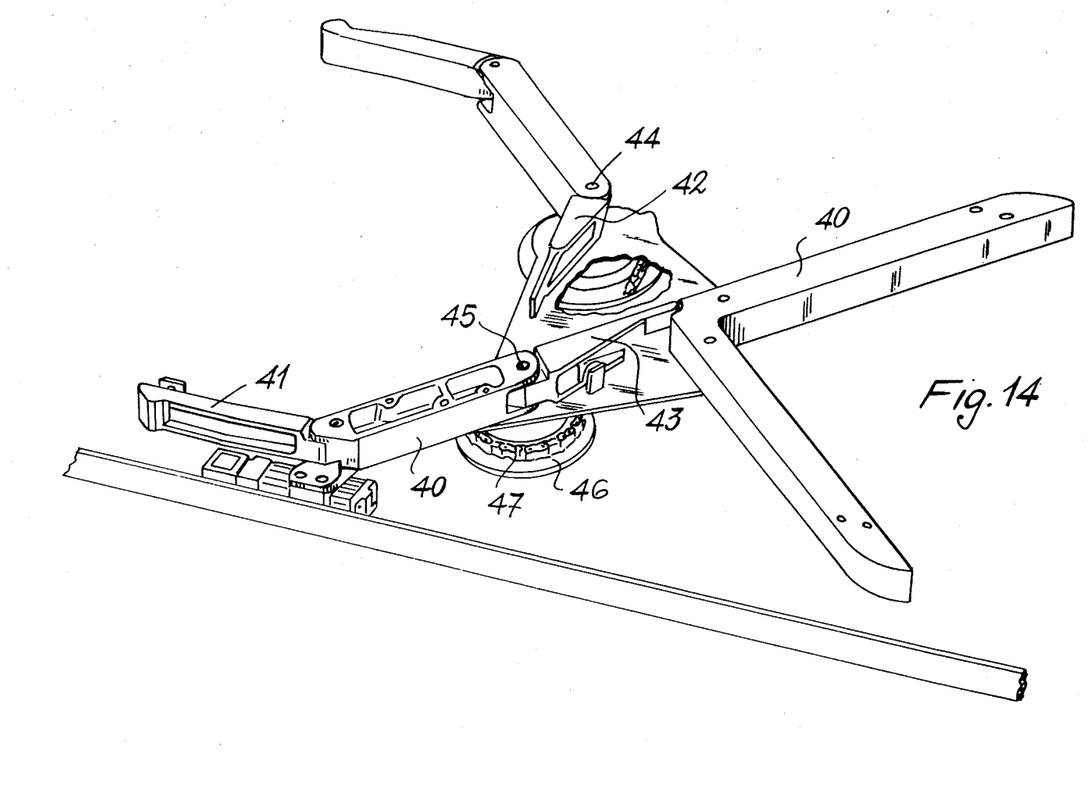
FIG. 14 represents a perspective view of a deviation device for the guide rail.

A different version of the invention foresees, in correspondence of the intersections of the guide rails, a switch as illustrated in FIG. 14.

According to this version the rail consists of fixed parts 40 the ends of which 41 are hinged to it and may be rotated, that is activated by devices of known types, up to the point where they will intersect the path of the throttle planet wheel. In correspondence with their intersection, the rails are interrupted by a tract which is closable by activating the ends 42 and 43 hinged onto the rails at 44 and 45. These ends are fixed onto axes fixed with the toothed wheels 46 connected by means of the chains 47. In this manner the planet wheel of the pushing element, during its run, hits against the end 42 (in the case the rail against which it slides is interrupted) and causes it to close the interruption.

At the same time, causing the rotation of end 42, it acts by means of the toothed wheels 46 and the chain 47, on end 43, which is pushed rotatably thus opening the passage. The transmission by means of toothed wheels and chain could be eventually substituted by a system of compensator and connecting rods or other similar systems.

Figure 11:
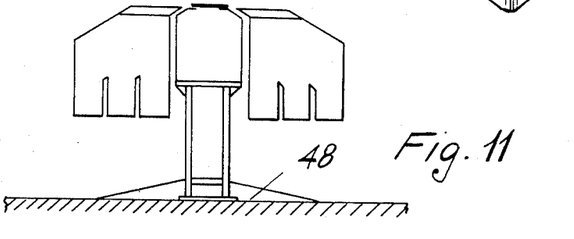
FIG. 11 is a schematic front view of a carrying device according to the invention.

According to an additional version, there is provided a central support (FIG. 11) in which the supports are made longer in order to form guides 48 for the insertion of the carts in correspondence with the hoppers.

Figures 15, 16, 17:
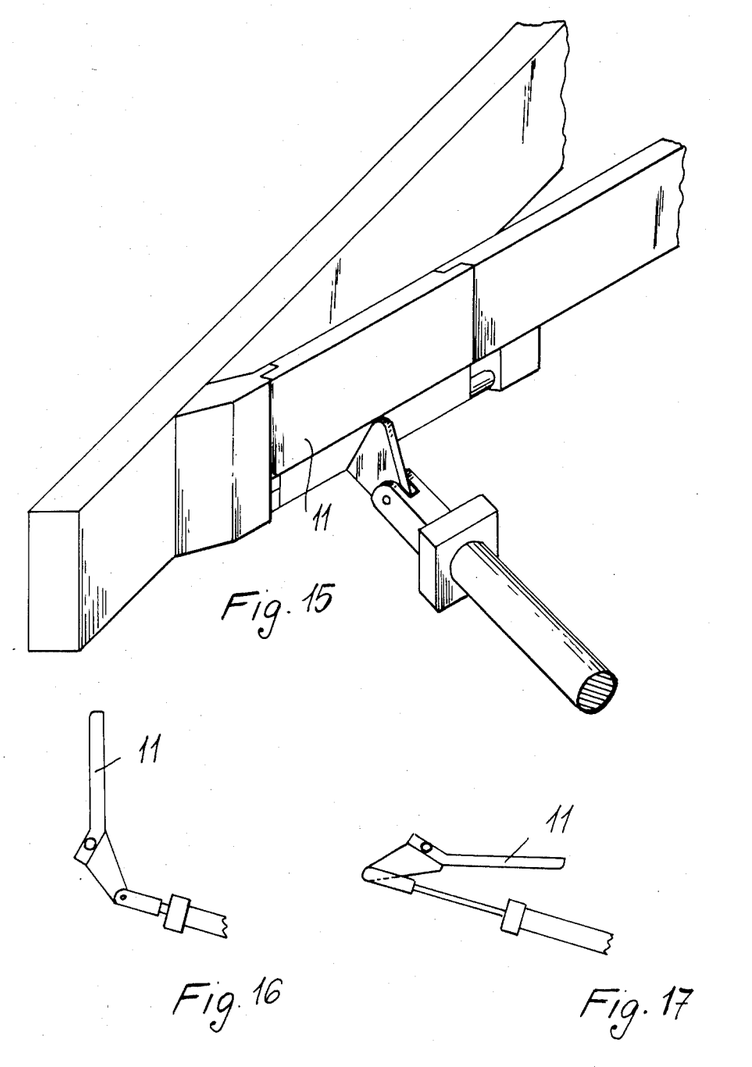
FIG. 15 is the perspective view of a detail of a movable section for the guide rail.
FIGS. 16 and 17 represent the detail of FIG. 15 in the work and in the rest positions, respectively.

A further version provides the movable part 11 with a rail, which will be interposed along the path of the throttle planet wheel, and which is capable of rotating about a horizontal axis as illustrated in FIGS. 15 to 17.

A command system, such as, for example, an electropneumatic system, acts upon an end of this movable part, hinged at the center, causing it to rotate from a horizontal rest position to a vertical position in which it intercepts the throttle planet wheel.

There may also be provided numerous variations, i.e., the command means for the panels may be different from those described. Another variation may be the possibility of coupling longitudinally two single-sided machines, one having a discharge side on the right side and one on the left, to obtain, with the same line structure, a single belt, with only one driving unit and with a double carrying capacity of objects to be sorted. Different forms or solutions can also be foreseen without, however, departing from the principles of the present invention.

What is claimed is:

1. An apparatus for selectively sorting objects comprising:
    a fixed conveyor table;
    an endless conveyor member mounted on said table for movement thereon in a conveyor path, said conveyor member made of a plurality of connected plates, a pushing element slidably mounted on each plate for movement in a transverse direction to said conveying path for discharging an object from said conveyor member;
    a plurality of object reception stations disposed along said table in said conveying path;
    transverse drive means connected to said table in the vicinity of each station for sliding at least ne of said pushing elements in said transverse direction; and
    multi-positioned hopper means at each of said stations for directing an object discharged from said conveyor member toward one of a plurality of spaced locations, spaced transversely to said conveying path; said transverse drive means comprising guide rail means connected to said table in the vicinity of each station having selectively openable and closeable interruptions therein, and a throttle planet wheel connected to each pusher element below its respective plate and engageable with at least one of said guide rail means, said throttle planetwheels comprising a frame rotatably mounted to said pusher element, at least two spaced rollers on said frame and biasing means connected to said frame for aligning the spacing between said rollers with said conveyor path, said frame alignable with at least one interruption to pass through said one interruption with said one interruption open and to move along said one interruption with said one interruption closed to move said pushing element in said transverse direction.

2. An apparatus according to claim 1, wherein said multi-position hopper means includes a single hopper having an inlet opening and a discharge opening pivotally mounted to said table and drive means for pivoting said hopper to move said discharge opening transversely to said conveying path.

3. An apparatus according to claim 1, wherein said multi-position hopper means comprises a single hopper having an inlet opening and a plurality of discharge openings, a plurality of panels pivotally mounted in said hopper and drive means connected to each of said panels for selectively positioning said panels to define a path between said inlet opening and a selected one of said discharge openings.

4. An apparatus according to claim 3, including a closure door pivotally mounted to said hopper adjacent each of said discharge openings, a common lever connected to each of said walls for moving each of said walls in unison into a position closing each of said respective discharge openings, a container carriage for carrying a plurality of containers equal in number to the number of said discharge openings and positionable under said hopper, a handle connected to said lever and engageable on said carriage to hold said carriage in a position under said hopper when said lever is moved to position each of said connected closure walls to open each of said respective discharge openings.

5. An apparatus for selectively sorting objects comprising:
a fixed conveyor table;
an endless conveyor member mounted on said table for movement thereon in a conveying path, said conveyor member made of a plurality of connected plates;
a pushing element slidably mounted on each plate for movement in a transverse direction to said conveying path for discharging an object from said conveyor member;
a plurality of object reception stations disposed along said table in said conveying path;
guide rail means connected to said table in the vicinity of each station having selectively openable and closeable interruptions therein; and a throttle planet wheel connected to each pushing element below its respective plate and engageable with at least one of said guide rail means to be guided therealong to move said pushing element across its respective plate, said throttle planet wheel comprising a frame pivotally mounted to said pushing element, a least two spaced rollers connected to said frame and biasing means connected to said frame for aligning the spacing between said rollers with said conveyor path, said frame alignable with at least one of said interruptions to pass through said one interruption with said interruption open and move along said interruption with said interruption closed.

6. An apparatus according to claim 1, or claim 5, wherein said guide rail means includes transversely opposite side rails extending in said conveying path, a guide rail extending at an angle to said conveying path and from one side rail to the other in the vicinity of each station, a movable rail portion in each guide rail adjacent an upstream end of each guide rail in said conveying path, each guide rail being spaced from one of said side rails at a downstream end of each guide rail in said conveying path, and a rail portion driver connected to each movable rail portion for selectively moving each movable rail portion toward its associated side rail to close said interruption and away from its associated side rail to open said interruption, a width of said throttle planet wheel transverse to said spacing between said at least two rollers being less than a width of each open interruption and the width of each throttle planet wheel in a direction parallel to said spacing between said rollers being greater than said open interruption width.

7. An apparatus according to claim 6, wherein said movable rail portion is pivotable about a vertical axis.

8. An apparatus according to claim 6, wherein said movable rail portion is pivotable about a vertical axis.

9. An apparatus according to claim 6, including a second guide rail crossing the path of said first-mentioned guide rail at a junction, each of said first-mentioned and second guide rails including upstream parts upstream of said junction in said conveying path, each part including a pivotally mounted end portion each pivotable into an open position for establishing an interruption in its associated guide rail, and a closed position for establishing a continuity in its respective guide rail, and interengagement means connected between each end portion for positioning one of said end portions in its open position and the other of said end portions in its closed position.

10. An apparatus according to claim 9, wherein said interengagement means comprises a sprocket connected to each end portion and a chain engaged around each of said sprocket.

11. An apparatus according to claim 1, or 5, wherein said throttle planet wheel further comprises an additional roller rotatably mounted between said first-mentioned spaced rollers on said frame, a pin connected to said pushing element and rotatably receiving said frame, said biasing means comprising a spring engaged on said pin and connected to said frame, said plate including a slit therein extending transversely across said plate through which said pin extends, a drive element connected to said pin below said plate and at least one guide rod connected to said plate and slidably receiving said drive element, said guide rod extending transversely across said plate in a direction perpendicular to said conveying path.

* * * * *